Jan. 26, 1965 E. ZALA 3,166,906
SAFETY DEVICE FOR HYDRAULIC SYSTEMS
Filed June 20, 1963 2 Sheets-Sheet 1
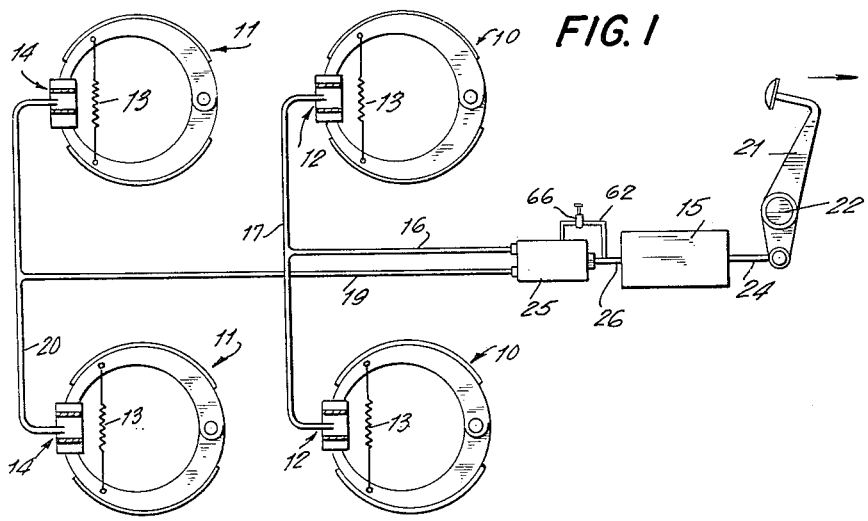
FIG. 1
FIG. 2
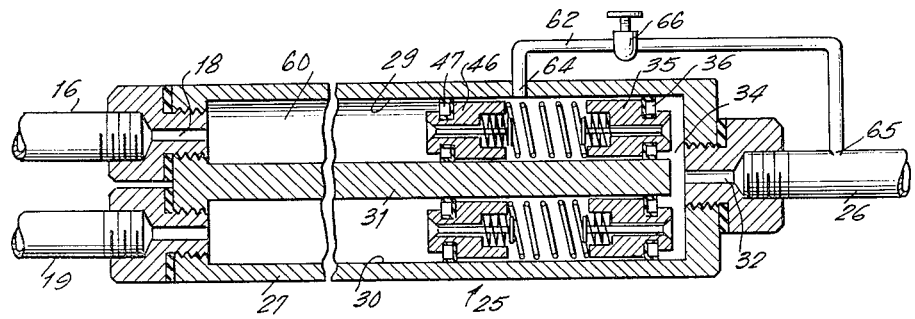
FIG. 3
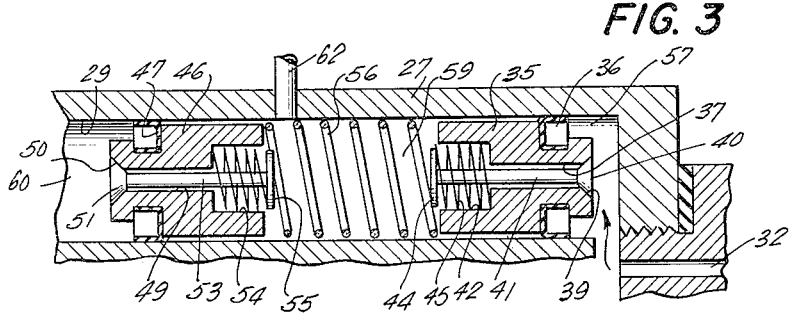
INVENTOR.
ERNST ZALA
BY Albert F. Kronman
ATTORNEY

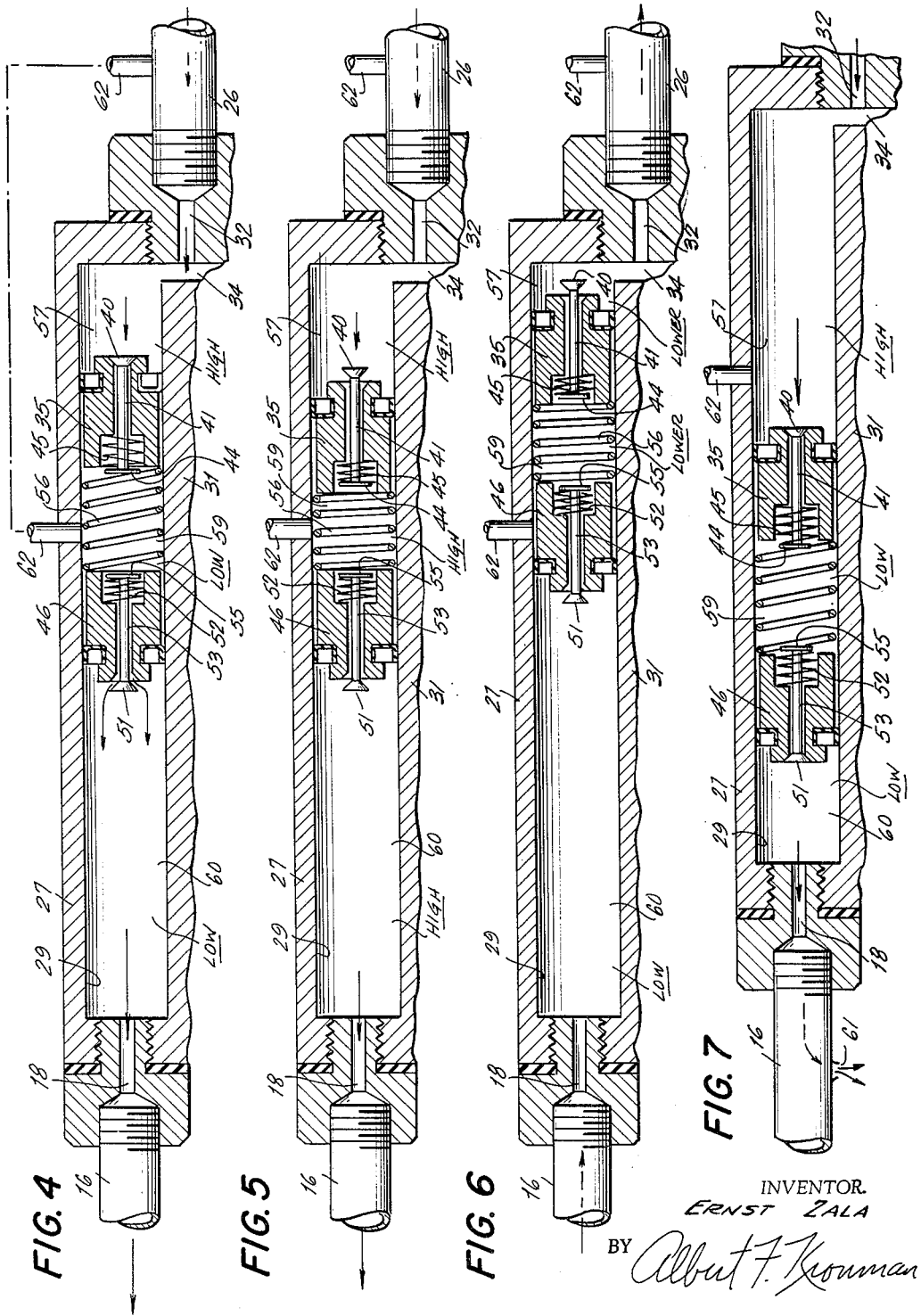

United States Patent Office 3,166,906
Patented Jan. 26, 1965

3,166,906
SAFETY DEVICE FOR HYDRAULIC SYSTEMS
Ernst Zala, Vienna, Austria, assignor to Eisenberg & Company/U.S.A. Agency, Inc., New York, N.Y., a corporation of New York
Filed June 20, 1963, Ser. No. 289,366
6 Claims. (Cl. 60—54.5)

This invention relates to a safety device for hydraulic systems having multiple branch lines connected in parallel to a common source of hydraulic pressure. A system with which the safety device of the present invention may be used is that employed with hydraulic brakes for vehicles, which is illustrated herein.

The primary braking system for most modern automobiles is hydraulically actuated, a single master cylinder actuated by the brake pedal supplying liquid under pressure to individual brakes located at each of the four wheels of the vehicle. If a leak should develop in the hydraulic system beyond the master cylinder, appreciable quantities of brake fluid may be lost and if the leak is of substantial size, the brakes on all four wheels of the vehicle may be rendered ineffective. Hydraulic brake systems for automobiles are particularly prone to leakage at the flexible conduits connecting the brakes at the front wheels to fixed parts of the hydraulic system.

The safety device of the present invention, which is adapted to be interposed between the source of fluid pressure and one or more branch conduits of the system, functions to cut off from the fluid pressure source a branch conduit in which a leak has developed. The device accomplishes this result while holding the pressure fluid loss to a low value, and maintains effective fluid pressure on the one or more non-leaking conduits. The safety device, as illustrated herein, has a double unit located at the junction of the conduits leading to the front and rear wheel brakes of an automobile. It is to be understood, however, that within the scope of the invention two such double units might be employed, one supplying the individual brakes at the front wheels and the other supplying the individual brakes at the rear wheels of the vehicle. Further, single units of the safety device might be interposed in each of the separate conduits leading to the individual brakes.

The invention has among its objects the provision of a novel safety device for hydraulic pressure systems having a plurality of conduits connected in parallel to a single source of hydraulic pressure.

A further object of the invention lies in the provision of a safety device of the type indicated which under normal operating conditions presents a direct fluid conducting passage through the safety device when the system is subjected to normal operating pressure from the pressure source.

Another object of the invention resides in the provision of a safety device which does not alter appreciably the normal manner of operation of the system, including the filling thereof with hydraulic fluid, and wherein under normal operation of the system the main parts of the safety device travel through only short distances in a cycle of operation of the system.

Yet another object of the invention lies in the provision of a novel safety device characterized by its positiveness in action, its reliability, its simplicity, and economy of manufacture and maintenance.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views:

FIG. 1 is a schematic view of a four wheel brake system for a vehicle, such system incorporating an illustrative embodiment of safety device in accordance with the invention;

FIG. 2 is an enlarged view in section through the safety device of FIG. 1, the section being taken in a plane parallel to the paper of FIG. 1, certain of the parts being shown in elevation, the figure showing the parts of the safety device in the positions they assume when the system is not subjected to hydraulic pressure;

FIG. 3 is an enlarged fragmentary view in section of the fluid-entering portion of the upper half of the safety device as it is shown in FIG. 2, the parts of the device being shown in the positions they assume at the start of the braking operation;

FIG. 4 is an enlarged view in section of the upper half or unit of the safety device of FIG. 2, the figure showing the safety device in an intermediate part of the cycle of brake application;

FIG. 5 is a view similar to that of FIG. 4 showing the unit of the safety device with both ends of the chamber therein subjected to full braking hydraulic pressure;

FIG. 6 is a view similar to that of FIG. 4, but with the parts of the safety device shown in the positions they assume as the brakes are being released; and FIG. 7 is a view similar to that of FIG. 4, but showing the safety device functioning to cut off communication between the fluid pressure source and a leaking branch conduit fed through the safety device.

In FIG. 1 there is schematically shown a hydraulic brake system for the front brakes 10 and the rear brakes 11 of an automobile. The brakes are of a conventional construction, each having double-ended cylinders in which pistons at both ends thereof cooperate with articulated brake shoes. The cylinders for the front wheels are designated 12 and those for the rear wheels 14. When such motors are subjected to appreciable hydraulic pressure through conduits 17 and 20, respectively, the motors function to thrust the brake shoes against the brake drums. When such hydraulic pressure is released, means at each brake, such as the coil tension springs 13 shown, function to retract the brake shoes from the brake drums and to return fluid in the cylinders 12, 14 toward the pressure source. In the system shown such pressure source is a master cylinder 15 which delivers fluid under pressure through a conduit 26 and thence to branch conduits 16 and 19, which are connected to the conduits 17 and 20, respectively. The master cylinder 15 is actuated by a conventional foot pedal 21 mounted on a fixed support (not shown) by a pivot pin 22 and pivoted at its lower end to a rod 24 connected to a piston in the master cylinder. The illustrative safety device 25 in accordance with the present invention is interposed between the supply conduit 26 and the main branch conduits 16 and 19 of the braking system.

The safety device 25 incorporates two similar units fed through a common pressure source, the upper one of such units, as is shown in FIG. 2, cooperating with the front wheel brakes 10 of the vehicle and the lower such units cooperating with the rear wheel brakes 11 thereof. Detailed discussion of the construction and the manner of operation of the safety device will be confined in the main to the upper unit of the device 25.

The safety device 25 has an elongated casing having two longitudinally disposed circular cylindrical bores therein forming an upper chamber 29 and a lower chamber 30 therein. Chambers 29 and 30 are separated by an intermediate wall 31 of the casing. The right hand end of each of chambers 29 and 30 is connected to the conduit 26 through a passage 32 from the conduit and a transverse passage 34 within the casing. Slidably mounted within the chamber 29 at the right hand end thereof is a first piston 35 which is sealed to the wall of chamber 29 by a pressure-expansible annular packing member 36 which is open to the chamber 57 at the right hand or pressure feeding end of the chamber.

Piston 35 has a central longitudinally disposed passage 37 therethrough, the right hand end of such passage, at the fluid inlet end of chamber 29, having an axially inwardly converging frusto-conical valve seat 39 therein. Reciprocably mounted in the passage 37 is a poppet valve member having a frusto-conical head 40 which is sealingly received within seat 39 when the valve occupies the position shown in FIGS. 2 and 3.

The stem 41 of the poppet valve member has a diameter substantially less than that of passage 37, so as to provide an annular opening of appreciable cross-section through piston 35 when such valve is open. The piston 35 and the valve member mounted thereon are provided with means which retain the valve member in its closed position when the fluid pressures on both sides of piston 35 are equal, and which also maintains the valve in closed position when the fluid pressure in the first space 57 within chamber 29, defined by the right hand end of the chamber and the piston 35, and appreciably exceeds the fluid pressure in the second space 59 in the chamber, immediately to the left of piston 35. Such means is provided by a counterbore 42 of appreciable axial length at the inner or left hand end of the passage 37 in the piston 35. The inner end of valve stem 41 is provided with an annular transverse disc-like member 44 which has a diameter somewhat less than that of counterbore 42. The valve member 40, 41 is urged to the left toward its closed position by a coil compression spring 45 of relatively small compressive strength which is disposed between the end wall of the counterbore 42 and the disc-like member 44. In the embodiment shown, member 44 has a diameter which somewhat exceeds the diameter of the outer larger end of the head 40 of the valve member.

Disposed in the chamber 29 to the left of the above described first piston 35 is a second piston 46 which is similar to piston 35 but which is disposed in the chamber 29 in the reverse direction. Piston 46 carries an annular sealing means 47 which maintains it in slidable sealed relationship with the wall of chamber 29. Piston 46 has a central passage 49 therethrough with a frusto-conical valve seat 50 at its left hand end, a valve member having a frusto-conical head 51 and an elongated stem 53 being disposed within the seat and passage, respectively, of piston 46. The valve member 51, 53 is urged toward its closed position, shown in FIGS. 2 and 3, by a relatively light coil compression spring 52 which is compressively engaged between the end wall of a counterbore 54 in piston 46 and a disc 55 which is connected to the left hand end of the stem 53 of the valve member.

The pistons 35 and 46 are resiliently held at a variable distance from each other by means of a relatively strong coil compression spring 56 which fits within chamber 29. The variable space 59 thus presented between the two opposed pistons is designated herein as the "second space" within the chamber. The space 60 between the left hand end of piston 46 and the left and or delivery end of chamber 29 is designated herein as the "third space" within the chamber.

The manner of operation of the safety device of the invention will be more readily understood upon consideration of FIGS. 2 to 6, inclusive, in sequence, which illustrate the successive portions of parts of the safety device during a normal braking cycle, and FIG. 7, which illustrates the operation of the safety device to prevent undue loss of hydraulic fluid when a leak has developed in the system, and to close off the leaking portion of the system from the pressure source.

In the "at rest" condition of FIG. 2 fluid pressure has been released in conduit 26 and the springs 13 of the respective brakes have caused fluid to flow back through the safety device 25 into the master cylinder 15. Under such conditions, the fluid pressure in each of the first, second, and third spaces within the chamber 29 is low and at least approximately equal, spring 56 is in substantially its relaxed, extended condition, and the valves in the first piston 35 and the second piston 46 are held closed by their respective springs 45 and 52.

When the fluid in conduit 26 in passages 34 and 32 is placed under pressure by operation of the brake pedal, fluid begins to flow into the first space 57 in chamber 29 and thus to move piston 35 to the left. In this initial stage of the braking operation, the increased hydraulic pressure acting upon the outer surface of valve head 40 holds the valve 40, 41 in closed position. The moving piston 35 acting through spring 56 causes the piston 46 to move to the left. This movement of the second piston causes the fluid in space 60 in chamber 29 to be placed under appreciable pressure, so that spring 56 is axially compressed somewhat and the length of the second space 59 in the chamber is decreased. Such condition is illustrated in FIG. 4.

Because of the increased pressure to which the fluid in the second space 59 in the chamber is now subjected, the valve 51, 53 in piston 46 is now opened by reason of the subjection of disc 55, which has a greater effective area than the larger diametered end of valve element 51, to the increased pressure in the second space 59 in the chamber 29. The opening of the valve 51, 53 permits fluid to flow from the second space 59 into the third space 60, with a consequent further compression of the spring 56. This in turn causes a further rise in pressure in the second space 59, such increased pressure acting upon the disc 44 forcing it into the counterbore 42 and thus opening the valve 40, 41 in piston 35. This condition is illustrated in FIG. 5, wherein the valves in both pistons are open and direct communication is provided between the spaces 57, 59 and 60 in chamber 29. Under such condition, the pressures within all three of such spaces are equal and the two pistons 35 and 46 with the interposed spring 56 move as a unit within chamber 29. Such movement, however, is not substantial because of the direct communication of fluid in the three spaces in the chamber provided through passages 37 and 49 in the pistons.

When foot pressure on the brake pedal is released, the hydraulic pressure within space 57 in the chamber 29 drops substantially. The pressure in space 60 remains elevated during the time that the springs 13 at the brakes function to return the fluid to the master cylinder 15. At this time, the pressure in the second space 59 at least equals that in the first space 57 and that in space 60. Thus, the valves in the first and second pistons 35 and 46, respectively, remain open, whereby fluid in space 60 flows through them and back into the conduit 26. During such operation, the members 35, 56, and 46 travel as a whole toward the right. Upon completion of this operation of the cycle the parts of the safety device will have regained the positions thereof shown in FIG. 2.

Upon the development of a leak in one of the branch conduits leading from the safety device, the respective part of the safety device affected by the leak operates to isolate and close off the leaking part of the hydraulic system from the source of pressure upon the application of pressure to the system. FIG. 7 illustrates this manner of operation of the safety device. It is assumed that a leak 61 of appreciable size has formed in the branch conduit 16. When the first space 57 of chamber 29 is now subjected to pressure, the elements 35, 56 and 46 move virtually as a unit to the left since the leak 61 does not permit any appreciable pressure to be built up in either the space 60 or the space 59. The fluid in space 60 is, of course, at least partially lost through the leak 61, but after the piston 46 has reached its terminal position abutting the left hand end of chamber 29, no further leakage from the pressure supply end of the system is possible. Thus the valve 40, 41 in piston 35 remains closed because the pressure in space 57 appreciably exceeds that in space 59. Once the piston 46 has reached the left hand end of the chamber 29, its valve 51, 53 is held in closed position by reason of its abutting the central end wall 67 at the left hand end of chamber 29. Thus the leak 61 is effectively isolated, and does not prevent the application of effective operating pressure to the remaining parts of the hydraulic system.

The hydraulic system may be filled with hydraulic fluid, when necessary, in the usual manner by filling a reservoir (not specifically shown) which may be disposed above the master cylinder 15. To permit spaces 59 and 60 of the safety device 25 to receive added fluid when required, a branch conduit 62 is connected to the casing 27 at a port 64, and to the conduit 26 at a port 65 therein. The port 64 is located so as to communicate with the space 59 between the pistons when the parts of the safety device are at their "at rest" position. Branch conduit 62 is provided with a manually operated shut-off 66 which is closed during normal operation of the safety device above described.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

What is claimed is:

1. In a fluid control system, a chamber disposed in the system and adapted to be connected to a source of intermittent fluid pressure at a first end thereof and to a delivery conduit at the second end thereof, a first free piston slidably disposed in sealing relation in the first end of the chamber, a second free piston slidingly disposed in sealing relation in the second end of the cylinder, resilient means disposed between and abutting the pistons to maintain the pistons at a variable distance from each other, the chamber and first piston defining a first space, the chamber and two pistons defining a second space, and the chamber and second piston defining a third space, passages through the two pistons affording direct series communication between the three spaces, a first valve selectively opening and closing the passage through the first piston, a second valve selectively opening and closing the passage through the second piston, means closing the first valve when the first space is subjected to a pressure which substantially exceeds the pressure in the second space and opening the second valve when the pressure in the second space substantially exceeds the pressure in the third space, said last named means being so constructed and arranged that both valves are open when the pressures in the three spaces are high and approximately equal during the application of pressure to the first end of the chamber from the pressure source.

2. Apparatus as claimed in claim 1, wherein each of the valves is a check valve having a movable valve element, the valve element of the first valve being urged toward valve closed position by the fluid pressure in the first space within the chamber, the valve element of the second valve being urged toward valve closed position by the fluid pressure in the third space within the chamber.

3. Apparatus as claimed in claim 2, wherein each valve comprises resilient means constantly urging the respective valve element toward valve closed position.

4. Apparatus as claimed in claim 3, wherein each valve comprises fluid pressure responsive means in pressure communicating relationship with the second space within the chamber, the first such fluid pressure responsive means opening the first valve when the fluid pressure in the second space in the chamber substantially equals the fluid pressure in the first space in the chamber, the second such fluid pressure responsive means opening the second valve when the fluid pressure in the second space in the chamber substantially equals the fluid pressure in the third space in the chamber.

5. Apparatus as claimed in claim 4, wherein each of the fluid pressure responsive means comprises a cylinder on the respective piston communicating at one end with the passage through the piston and at its other end with the second space within the chamber, a plunger loosely fitting within the cylinder, and means connected to the plunger for unseating the movable valve element of the respective valve when the plunger is thrust into the cylinder by the pressure of the fluid in the second space in the chamber.

6. In a fluid control system, a chamber disposed in the system and adapted to be connected to a source of intermittent fluid pressure at a first end thereof and to a delivery conduit at the second end thereof, a first free piston slidably disposed in sealing relation in the first end of the chamber, a second free piston slidingly disposed in sealing relation in the second end of the cylinder, resilient means disposed between and abutting the pistons to maintain the pistons at a variable distance from each other, the chamber and first piston defining a first space, the chamber and two pistons defining a second space, and the chamber and a second piston defining a third space, passages through the two pistons affording series communication between the three spaces, a first valve selectively opening and closing the passage through the second piston, means closing the first valve when the first space is subjected to a pressure which substantially exceeds the pressure in the second space, and means opening the second valve when the pressure in the second space substantially exceeds the pressure in the third space, said last named two means being so constructed and arranged that both valves are open when the pressure in the three spaces are high and approximately equal during the application of pressure to the first end of the chamber from the pressure source.

References Cited in the file of this patent

UNITED STATES PATENTS

| 1,633,114 | Loose | June 21, 1927 |
| 2,095,560 | Vickers | Oct. 12, 1937 |
| 2,166,747 | Best | July 18, 1939 |
| 2,216,847 | Loweke | Oct. 8, 1940 |
| 2,451,828 | Herriott | Oct. 19, 1948 |

FOREIGN PATENTS

| 733,940 | Germany | Apr. 5, 1943 |